United States Patent
Meredith et al.

(10) Patent No.: US 10,691,745 B2
(45) Date of Patent: Jun. 23, 2020

(54) PLANOGRAM COMPLIANCE SCORING BASED ON IMAGE ANALYSIS

(71) Applicant: AT&T Intellectual Property I, L.P., Atlanta, GA (US)

(72) Inventors: Sheldon Meredith, Roswell, GA (US); William C. Cottrill, Canton, GA (US); Brandon Hilliard, Canton, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 169 days.

(21) Appl. No.: 15/987,001

(22) Filed: May 23, 2018

(65) Prior Publication Data
US 2019/0361993 A1 Nov. 28, 2019

(51) Int. Cl.
| | |
|---|---|
| *G06F 16/583* | (2019.01) |
| *G06F 16/2457* | (2019.01) |
| *G06K 9/00* | (2006.01) |
| *G06Q 10/08* | (2012.01) |
| *G06K 9/62* | (2006.01) |

(52) U.S. Cl.
CPC .... *G06F 16/5854* (2019.01); *G06F 16/24578* (2019.01); *G06K 9/00624* (2013.01); *G06K 9/00671* (2013.01); *G06K 9/00691* (2013.01); *G06K 9/6202* (2013.01); *G06Q 10/087* (2013.01)

(58) Field of Classification Search
CPC .......... G06F 16/24578; G06F 16/5838; G06K 9/00624; G06K 9/00671; G06K 9/00691; G06K 9/6202; G06Q 10/087; G06Q 30/00
See application file for complete search history.

(56) References Cited

U.S. PATENT DOCUMENTS

| | | | |
|---|---|---|---|
| 4,947,322 A | 8/1990 | Tenma et al. | |
| 5,383,111 A | 1/1995 | Homma et al. | |
| 7,168,618 B2 | 1/2007 | Schwartz | |
| 9,594,980 B1 * | 3/2017 | Graham | H04N 5/23222 |

(Continued)

OTHER PUBLICATIONS

Frontoni, Emanuele, et al., "Embedded Vision Sensor Network for Planogram Maintenance in Retail Environments", Sensors, ISSN 1424-8220, pp. 21114-21133. (Year: 2015).*

(Continued)

*Primary Examiner* — Scott A. Waldron
(74) *Attorney, Agent, or Firm* — Kilpatrick Townsend & Stockton LLP

(57) ABSTRACT

An arrangement of physical objects can be analyzed using a captured digital image of the arrangement and a reference display file database. A processing device communicatively coupled to the reference display file database receives the captured image depicting the arrangement of physical objects and accesses a reference display file from the reference display file database. The reference display file includes multi-viewpoint image data and scoring components. The processing device identifies at least some of the physical objects using the reference display file. The processing device scores each identified object for such attributes as presence, position and orientation using the scoring components from the reference display file, producing an overall score based on the scoring of each identified object. The processing device can then transmit the overall score to other systems.

20 Claims, 4 Drawing Sheets

(56) References Cited

U.S. PATENT DOCUMENTS

| | | | |
|---|---|---|---|
| 2008/0147475 A1 | 6/2008 | Gruttadauria | |
| 2012/0022913 A1 | 1/2012 | Volkmann et al. | |
| 2012/0055985 A1 | 3/2012 | Allen | |
| 2012/0308086 A1* | 12/2012 | Atsmon | G06Q 30/02 |
| | | | 382/110 |
| 2015/0026012 A1 | 1/2015 | Gura et al. | |
| 2015/0032572 A1 | 1/2015 | Spano et al. | |
| 2017/0177969 A1* | 6/2017 | Zaremski | G06K 9/00771 |
| 2017/0178060 A1* | 6/2017 | Schwartz | G06K 9/4604 |
| 2017/0337508 A1* | 11/2017 | Bogolea | G06K 9/033 |
| 2017/0344935 A1 | 11/2017 | Mattingly et al. | |
| 2018/0005035 A1* | 1/2018 | Bogolea | B25J 9/1664 |
| 2018/0300043 A1* | 10/2018 | Graham | G06F 3/04842 |
| 2019/0236531 A1* | 8/2019 | Adato | G06K 9/00664 |

OTHER PUBLICATIONS

Chong, Timothy, et al., "Deep Learning Approach to Planogram Compliance in Retail Stores", Stanford University, CS 229 Machine Learning Final Projects, Autumn 2016, 6 pages. (Year: 2016).*

* cited by examiner

PLANOGRAM COMPLIANCE SCORING BASED ON IMAGE ANALYSIS

TECHNICAL FIELD

This disclosure generally relates to image analysis. More specifically, this disclosure relates to analyzing images containing multiple objects by comparison to a reference image or images.

BACKGROUND

Standardized arrangements of physical objects are often used for display purposes, with the expectation that any such arrangements produced at any location will comply with the standard. To the extent such standardized arrangements are updated with new objects or aesthetics, there is a desire to know how timely and effectively changes are being made in the field. This knowledge is often acquired by manual inspection, involving either many people or extensive travel.

SUMMARY

In one example, a system includes a reference display file database, a non-transitory computer-readable medium storing computer program code for analyzing an arrangement of physical objects, and a processing device communicatively coupled to the reference display file database and the non-transitory computer-readable medium, wherein the processing device is configured for executing the computer program code to perform operations. The operations include receiving a captured image depicting the arrangement of physical objects and accessing a reference display file from the reference display file database. The reference display file includes multi-viewpoint image data and scoring components. The operations further include identifying at least some of the physical objects using the reference display file, scoring each identified object for presence and orientation using the scoring components from the reference display file, producing an overall score based on the scoring of each identified object, and transmitting the overall score.

In another example, a method includes receiving, by a processor, a captured image depicting an arrangement of physical objects, identifying, by the processor, at least some of the physical objects using a reference display file from a reference display file database. The reference display file includes multi-viewpoint image data and scoring components. The method further includes scoring, by the processor, each identified object for presence and orientation using the scoring components from the reference display file, producing, by the processor, an overall score based on the scoring of each identified object, and transmitting, by the processor, the overall score.

In another example, a non-transitory computer-readable medium includes computer program code executable by a processor to cause the processor to perform operations. The operations include receiving a captured image depicting an arrangement of physical objects and identifying at least some of the physical objects using a reference display file from a reference display file database. The reference display file includes multi-viewpoint image data and scoring components. The operations further include scoring each identified object for presence, position, and orientation using the scoring components from the reference display file, producing an overall score based on the scoring of each identified object, and transmitting the overall score.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
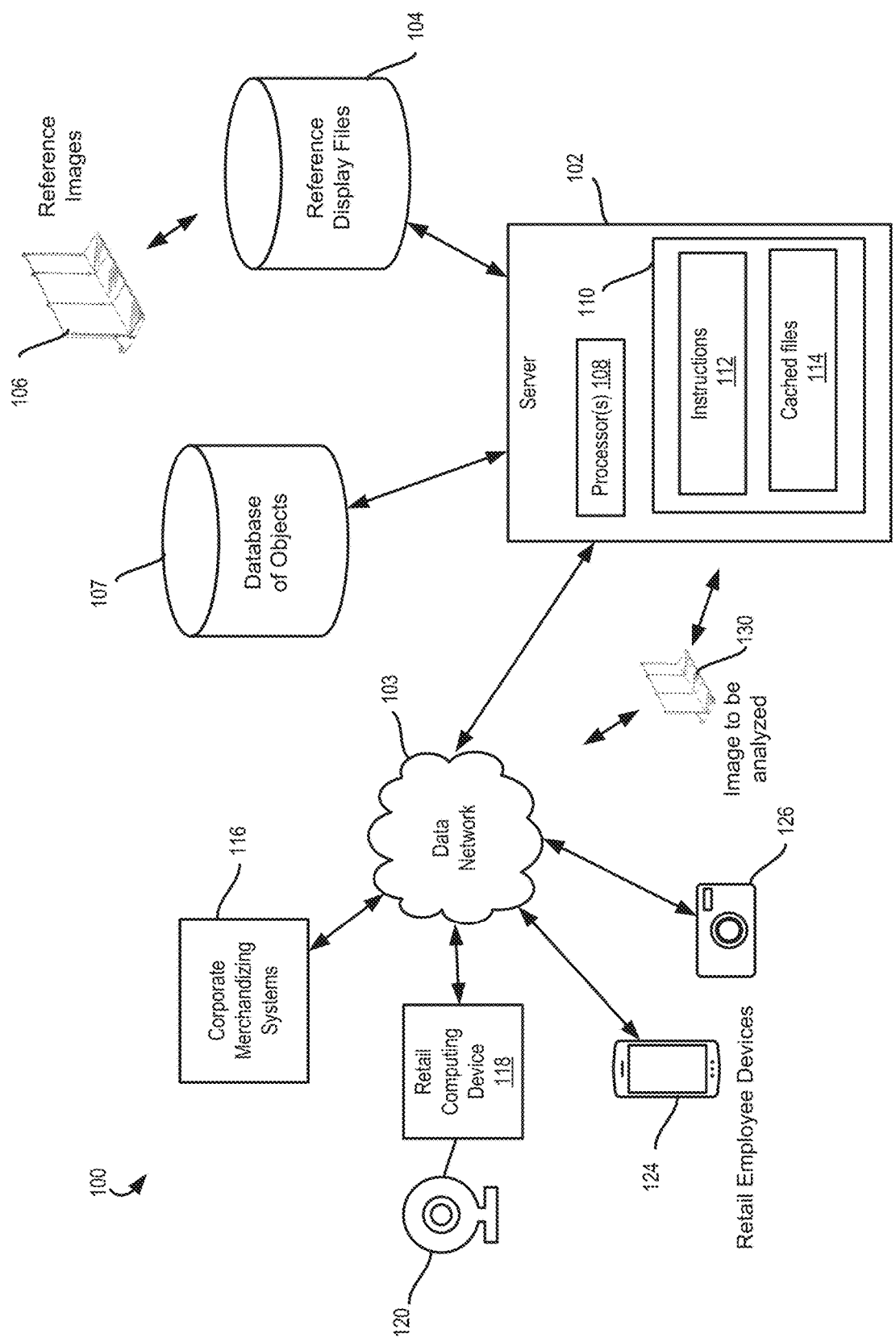
FIG. 1 is a block diagram depicting a system for reference-based image analysis according to some aspects of the present disclosure.

Certain aspects of this disclosure relate to programmatically analyzing and scoring an arrangement of physical objects used for display purposes, which may be referred to herein as a "display." The analysis makes use of a captured digital image of the arrangement of physical objects and a reference display file obtained by accessing a reference display file database. The reference display file includes multi-viewpoint image data and scoring components. The reference display file defines attributes based on a "reference display," which is a standardized or desired arrangement of physical objects on display. An overall score is generated. The overall score represents a measure of how closely the display being analyzed conforms to the reference display in terms attributes such as object presence, object location, object orientation, and the physical construct of the display space.

At least some aspects of the disclosure relate to identifying individual objects and to the use of this identification for comparative scoring of entire displays composed of many objects against the reference display. The reference display is not just an image, but instead a defined arrangement of objects for which location, orientation, and spacing are stored in a reference display file. For example, a display might have attributes such as: a three row display where the bottom row is 48 inches above the floor; a height of the first row that is eight inches and a color for that row is royal blue; a height of the second row that is 12 inches and a color of that row that is silver; a third row is 16 inches and is white; a first object X is at location Lx with orientation Ox; a second object Y is at location Ly with orientation Oy; a third object Z is located at Lz with orientation Oz; all objects with pricing below them by one inch; and all electronic objects have power turned on.

Since the reference display file has imagery of each object from different viewing angles available in a database, image collection and analysis computer program instructions inspect the digital image of a display in a specific location and identify each of the desired objects. When each object is identified, the object's location and orientation in the display can also be known. Objects in the display that are not supposed to be there may be generally classified or specifically identified by querying a general database of objects. The scoring of such a display can include several components, for example: objects that are supposed to be there are there; the orientation and position of these objects is compliant with the reference display; objects that are not supposed to be there are not there; and the overall appearance such as height, width, style, and color scheme (the "physical construct") of the display is compliant with the reference display. Objects include but are not limited to products, prices, labels, barcodes, QR codes, text, pictures, and video.

Certain aspects of the disclosure have an example application in the analysis of merchandise displays. Businesses with many merchandising locations can use imagery of merchandise displays to assess how quickly and how effectively merchandise displays comply with direction as asserted via sharing of the reference display information with location personnel. The use of reference-based image analysis according to some aspects can allow a business to reduce headcount and travel. A reporting subsystem provides scoring and analysis showing where gaps exist in a store's display. The reports allow a store manager to drive compliance to the reference display rather than wait for direction from higher-ups.

Certain aspects can also be used to ensure compliance with employee protection laws by verifying that employee or public notices are properly posted. For example, a corporation may require each of its offices post certain information about union rights, emergency exits, violation reporting, and building manager contact info. An analyzed, captured image of this arrangement of objects (posters and flyers), as compared to a reference display, would quickly identify any gaps, which can be reported as needed. Similarly, when product recall notices are to be posted at a retail store, reference-based image analysis can provide information as to whether all of the required postings have been made, thereby reducing potential liability on the part of the retailer.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Referring now to the drawings, FIG. 1 depicts an example of a system 100 for providing reference-based image analysis according to some aspects. FIG. 1 depicts examples of hardware components of a system 100. The system 100 includes server 102. Server 102 may be a computer or other machine that processes the images received within the system 100. The server 102 may include one or more other systems. For example, the server 102 may include adapters, routers, etc., for accessing network-attached data stores, a communications network, or both. In this example, server 102 is connected to data network 103. The data network 103 can also be incorporated entirely within (or can include) the Internet, an intranet, an extranet, or a combination thereof. In one example, communications between two or more systems or devices can be achieved by a secure communications protocol, such as secure sockets layer ("SSL") or transport layer security ("TLS"). The system 100 includes one or more network-attached data stores 104, which can store reference display files produced from reference images 106 of reference merchandising displays.

The system 100 of FIG. 1 also includes one or more network attached data stores 107, which can store a general database of objects to be referenced in determining the identity of objects in a display image being analyzed that are not included in the reference display. Data stores 104 and 107 may be connected to server 102 over data network 103 instead of being connected locally as illustrated in FIG. 1. Server 102 further includes a processor or processors 108 and a non-transitory memory device 110. Non-transitory memory device 110 is used to store computer program code instructions 112 for causing processor 108 to perform operations for reference-based image analysis as described herein. Non-transitory memory device 110 may also include cached files 114, such as reference display files and captured image files being used by the processor to perform these operations.

Still referring to FIG. 1, data network 103 in system 100 connects server 102 to corporate merchandizing computer systems 116 and retail computing devices 118. The reference-based image analysis described herein may be an in-house capability of the enterprise that owns or controls the corporate merchandizing computer systems 116 or may be provided by a third party. Scoring results can be reported to corporate merchandizing computer systems 116 by server 102 over data network 103. Data network 103 in system 100 also connects server 102 to a retail computing device 118, which may be a point-of-sale terminal or personal computer that receives prompts for image capture device 120 installed in proximity to a display of physical objects to obtain a captured image, which is then transmitted over data network 103 and received by server 102. At some locations where displays need to be analyzed, a prompt may be sent to an employee or manager to capture and upload an image using a retail mobile device such as smartphone 124 or network-connected digital camera 126. Captured images 130 resulting from either of these capture scenarios to be analyzed are forwarded to server 102 over data network 103.

A reference display file according to some aspects includes a list of objects and multi-viewpoint imagery for each. The reference display file also includes required position, orientation, and other image constraints. Each of these components of the reference display file is stored with a corresponding scoring contribution value. Objects may include physical items, pricing, barcodes, QR codes, text, images, video, display stand attributes, color schemes, etc. Each attribute has a predetermined scoring component. The reference display file is produced from a reference image. The reference image is not actually used for analysis, but is instead an observable implementation of the reference display file. In some aspects, the image can be reproduced by placing listed objects onto a user interface, much like objects in a video game can be manipulated and displayed.

The numbers of devices depicted in FIG. 1 are provided for illustrative purposes. Different numbers of devices may be used. For example, while each device, server, and system in FIG. 1 is shown as a single device, multiple devices may instead be used. Each communication within the system 100 may occur over one or more data networks 103. Data networks 103 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN. A wireless network may include a wireless interface or combination of wireless interfaces. A wired network may include a wired interface. The wired or wireless networks may be implemented using routers, access points, bridges, gateways, or the like, to connect devices in the data network 103.

Any computing device that is used as or implements a reference-based image analysis system according to at least some aspects of the present disclosure may contain many of the same elements as described with respect to server 102 of FIG. 1. As an example, a computing device includes a main processor device, control, and power logic, RAM, flash memory, a battery, and the audio and visual I/O. The processing device can execute one or more operations for transmitting, receiving, and decoding signals. The processing device can execute instructions stored in a non-transitory memory device such as non-transitory memory device 110 to perform the operations. The processing device can include one processing device or multiple processing devices. Non-limiting examples of a processing device include a field-programmable gate array ("FPGA"), an application-specific integrated circuit ("ASIC"), a microprocessing device, etc.

A memory device storing computer program instructions executable by the processing device can include any type of memory device that retains stored information when powered off. A computer-readable medium can include electronic, optical, magnetic, or other storage devices capable of providing the processing device with computer-readable instructions or other program code. Such a medium may store the instructions on a server prior to installation in or programming of a proximity-based security mechanism. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions.

Figure 2:
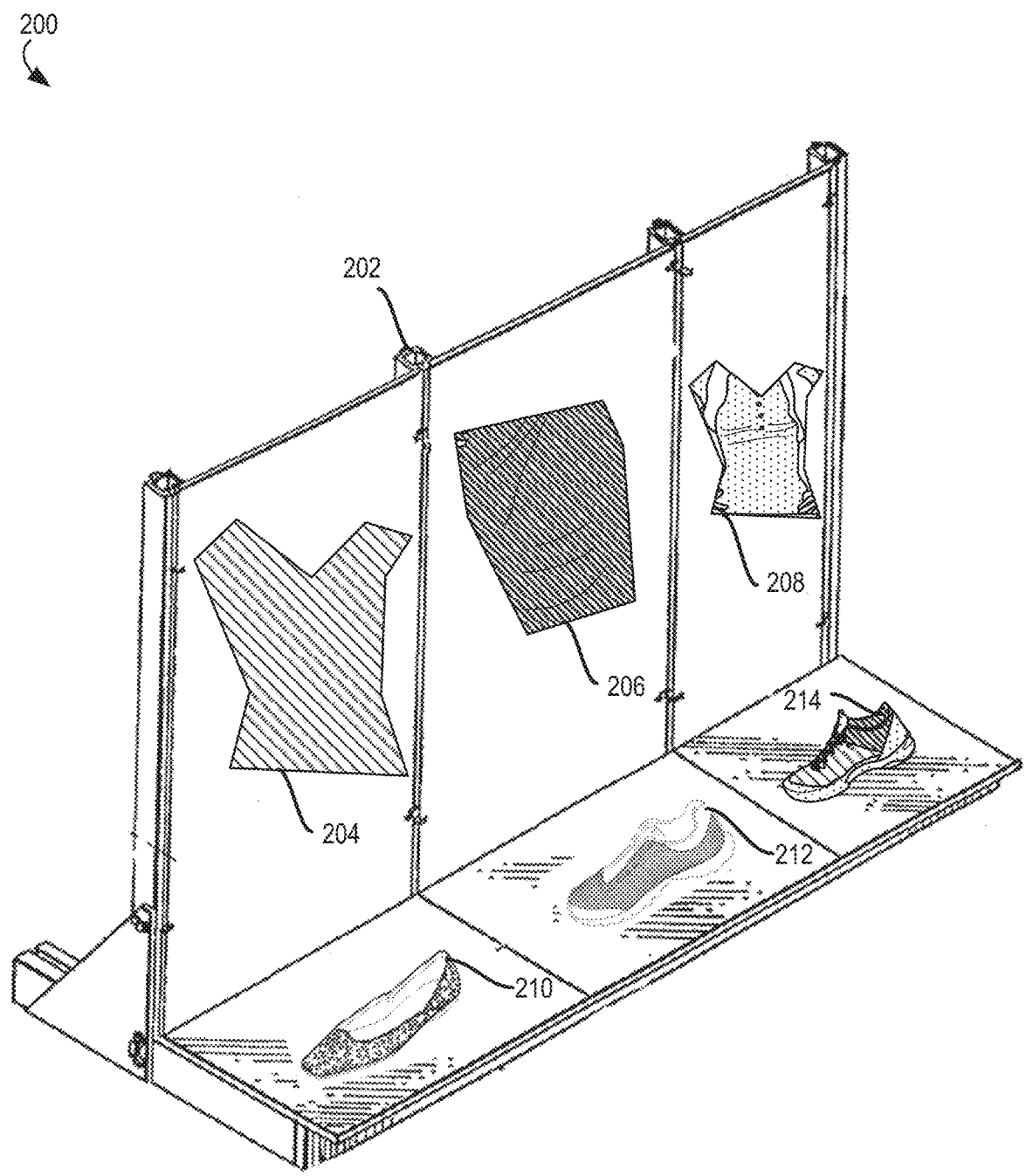
FIG. 2 is a reference display that forms the basis of a reference image used for reference-based image analysis according to some aspects of the present disclosure.

FIG. 2 is an example reference display 200 that could form the basis of a reference image and reference display file used for reference-based image analysis according to some aspects of the present disclosure. The reference display file is stored in data store 104 of FIG. 1. Reference display 200 includes a panelized display stand 202 with three panels and three shelves. Display stand 202 is to be used in clothing merchandising locations. The particular merchandising display illustrated in FIG. 2 includes striped top 204 on the left, skirt 206 in the center, and polka dotted top 208 on the right, all displayed on interchangeable vertical panels. The reference display also includes three shoe choices arranged on shelves with slip-on shoe 210 on the left shelf, casual shoe 212 on the center shelf, and sneaker 214 on the right shelf. The panels and shelves all have a particular height, width and color. The clothing is all shown flat, oriented as it would be worn, and the shoes are shown oriented with their sides facing the viewer so that the colors and patterns may be easily seen.

Figure 3:
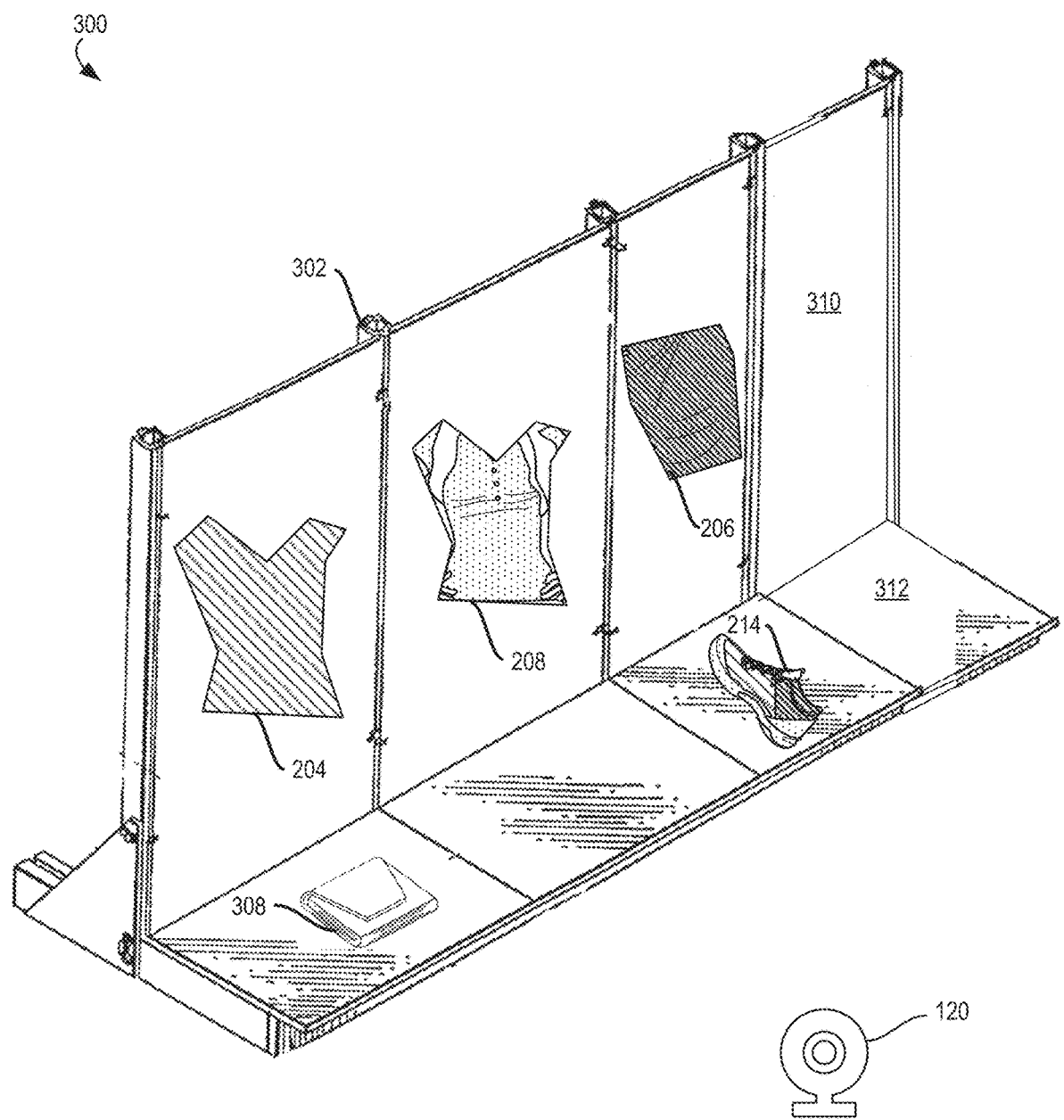
FIG. 3 is an object display to be analyzed according to some aspects of the present disclosure.

FIG. 3 illustrates objects arranged as a merchandising display 300 at a retail location. Display 300 is supposed to be arranged in the same manner has reference display 200. The objects in display 300 will be scored for parameters such as presence, location, and orientation. Missing objects will also be noted, as well as extra objects. Server 102 will receive a captured image of display 300 via image capture device 120 installed in proximity to display 300. Display 300 includes striped top 204 displayed in the proper orientation in the left display panel of panelized display stand 302. Thus, top 204 will receive a high score. Top 208 and skirt 206 are displayed in the proper orientation, but are not in the proper position, having been reversed left to right. Since objects are scored for position, these objects will receive a lower score than striped top 204. Shoes 210 and 212 are missing from the display, so will receive a score of zero. Sneaker 214 is in the display, and is in the rightmost panel that features any objects, however it is oriented front to back instead of sideways. The score for sneaker 214 will be lowered as appropriate.

Still referring to FIG. 3, in addition to receiving a lower score due to missing objects, display 300 will receive a lower score due to an object in the display that is not supposed to be present. Pocketbook 308 is not part of reference display 200, and so should not be included in display 300. Optionally, this unreferenced object can be identified as a pocketbook by querying the general objects database in data store 107 of FIG. 1. The overall score of display 300 will also be determined by the physical construct of the display. In this case, display 300 has an extra, unused panel 310 and an extra, unused shelf 312. The presence of unused panel 310 and unused shelf 312 will each result in a lower score for the physical construct of the display, and a lower overall score as calculated by computer program code instructions 112 of FIG. 1.

Figure 4:
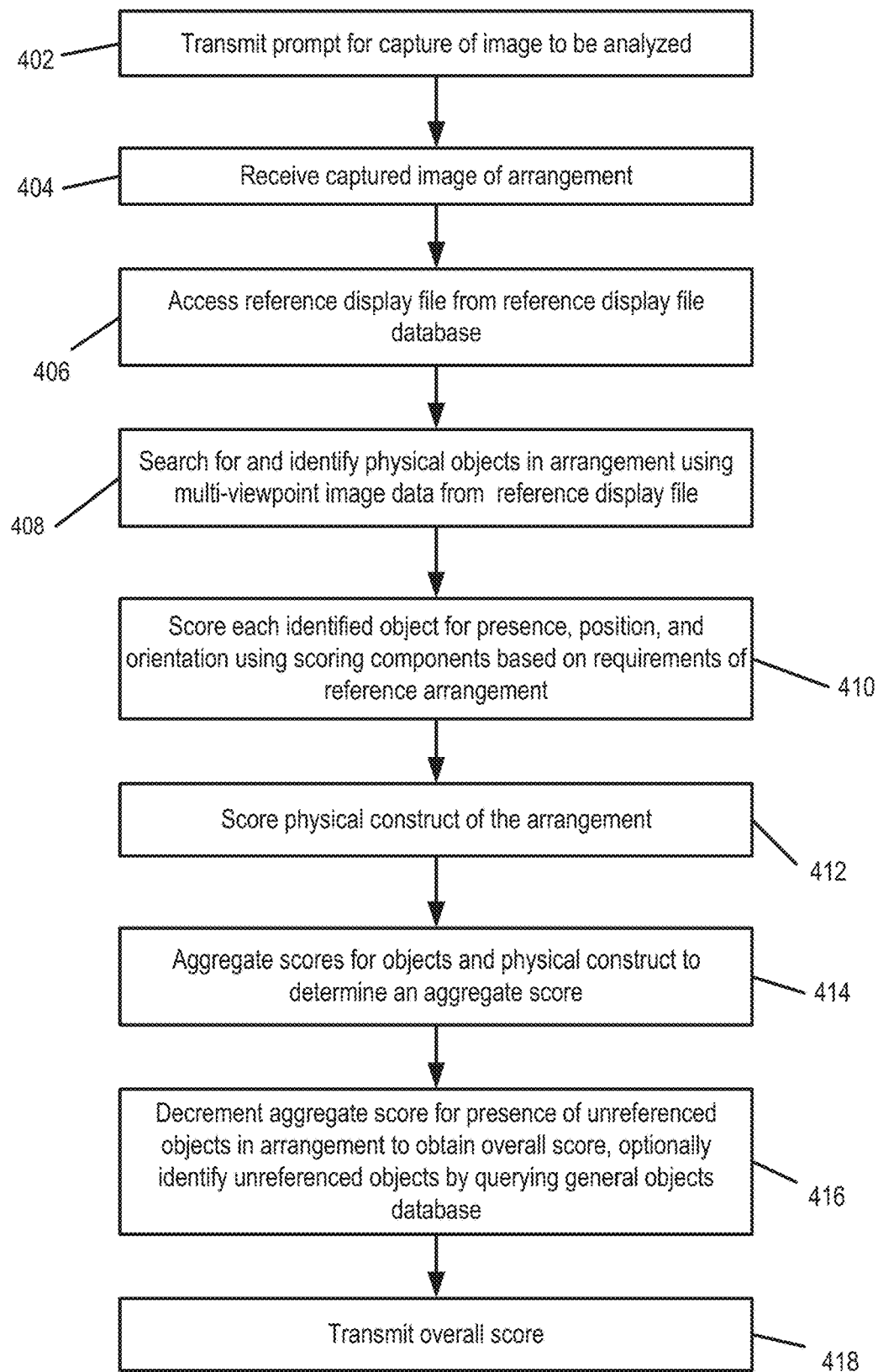
FIG. 4 is a flowchart illustrating a process for providing reference-based image analysis according to some aspects of the present disclosure.

FIG. 4 depicts a flowchart illustrating a process 400 for providing reference-based image analysis according to some aspects of the present disclosure. At block 402, server 102 transmits a prompt for an image capture device to obtain the captured image of an arrangement of physical objects to be analyzed, for example, display 300 of FIG. 3. This prompt can either cause an imaging device in proximity to the arrangement of physical object to capture the image or direct that image be captured, for example, by displaying a request to a user. At block 404, the captured image is received by server 102. At block 406, server 102 accesses the appropriate reference display file from a database of reference display files kept within data store 104. The reference display file may be cached in non-transitory memory device 110. At block 408, processor 108 searches for and identifies at least some of the physical objects using the reference display file. The reference display file includes multi-viewpoint image data and scoring components. Processor 108 uses the multi-viewpoint image data to identify an object regardless of the object's orientation in the displayed arrangement.

Still referring to FIG. 4, at block 410, processor 108 scores each identified object for presence, position, and orientation using the scoring components present in the reference display file. At block 412, processor 108 scores the physical construct of the arrangement. At block 414, processor 108 aggregates the scores for individual, identified objects and the physical construct to produce an aggregate score. At block 416, processor 108 decrements the aggregate score for unreferenced objects. Unreferenced objects are objects that appear in the arrangement being analyzed but that are not in the reference display. The decremented score becomes the overall score for the arrangement being analyzed. Optionally, unreferenced objects can be identified by querying general objects database residing in data store 107 of FIG. 1. At block 418, the overall score is transmitted for review. For example, with the system of FIG. 1, the overall score is transmitted by server 102 to corporate merchandizing computer systems 116 using data network 103. The overall score can optionally be reported along with a list of gaps in the analyzed arrangement of objects that resulted in a score that is below what is expected.

Unless specifically stated otherwise, throughout this specification terms such as "processing," "computing," or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

The invention claimed is:

1. A system comprising:
a reference display file database;
a non-transitory computer-readable medium storing computer program code for analyzing an arrangement of physical objects; and
a processing device communicatively coupled to the reference display file database and the non-transitory computer-readable medium, wherein the processing device is configured for executing the computer program code to perform operations comprising:
receiving a captured image depicting the arrangement of physical objects;
accessing a reference display file from the reference display file database, the reference display file including multi-viewpoint image data and scoring components;
identifying at least some of the physical objects depicted in the captured image using the reference display file;
scoring each identified object for presence, position, and orientation using the scoring components from the reference display file;
producing an overall score for the arrangement of physical objects depicted in the captured image based on the scoring of each identified object, wherein a score is reduced for each identified object with a physical orientation that differs from an orientation image constraint in the reference display file; and
transmitting the overall score.

2. The system of claim 1 wherein the overall score is produced at least in part by operations comprising:
determining an aggregate score based on the score for each identified object; and
decrementing the aggregate score for an unreferenced object in the arrangement of physical objects to produce the overall score.

3. The system of claim 2 wherein the operations further comprise identifying the unreferenced object by querying a general objects database.

4. The system of claim 1 wherein the operations further comprise scoring a physical construct of the arrangement of physical objects and wherein the overall score is further based on the scoring of the physical construct.

5. The system of claim 1 wherein each identified object is further scored for position.

6. The system of claim 1 wherein the operations further comprise transmitting a prompt for an image capture device installed in proximity to the arrangement of physical objects to obtain the captured image.

7. The system of claim 1 wherein the operations further comprise transmitting a prompt to a mobile device to display a request to obtain the captured image.

8. A method comprising:
receiving, by a processor, a captured image depicting an arrangement of physical objects;
identifying, by the processor, at least some of the physical objects depicted in the captured image using a reference display file from a reference display file database, the reference display file including multi-viewpoint image data and scoring components;
scoring, by the processor, each identified object for presence, position, and orientation using the scoring components from the reference display file;
producing, by the processor, an overall score for the arrangement of physical objects depicted in the captured image based on the scoring of each identified object, wherein a score is reduced for each identified object with a physical orientation that differs from an orientation image constraint in the reference display file; and
transmitting, by the processor, the overall score.

9. The method of claim 8 further comprising:
determining an aggregate score based on the score for each identified object; and
decrementing the aggregate score for an unreferenced object in the arrangement of physical objects to produce the overall score.

10. The method of claim 9 further comprising identifying the unreferenced object by querying a general objects database.

11. The method of claim 8 further comprising scoring a physical construct of the arrangement of physical objects and wherein the overall score is further based on the scoring of the physical construct.

12. The method of claim 8 wherein each identified object is further scored for position.

13. The method of claim 8 further comprising transmitting a prompt for an image capture device installed in proximity to the arrangement of physical objects to obtain the captured image.

14. The method of claim 8 further comprising transmitting a prompt to a mobile device to display a request to obtain the captured image.

15. A non-transitory computer-readable medium including computer program code executable by a processor to cause the processor to perform operations, the operations comprising:

receiving a captured image depicting an arrangement of physical objects;

identifying at least some of the physical objects depicted in the captured image using a reference display file from a reference display file database, the reference display file including multi-viewpoint image data and scoring components;

scoring each identified object for presence, position, and orientation using the scoring components from the reference display file;

producing an overall score for the arrangement of physical objects depicted in the captured image based on the scoring of each identified object, wherein a score is reduced for each identified object with a physical orientation that differs from an orientation image constraint in the reference display file; and transmitting the overall score.

16. The non-transitory computer-readable medium of claim 15 wherein the operations further comprise:

determining an aggregate score based on the score for each identified object; and decrementing the aggregate score for an unreferenced object in the arrangement of physical objects to produce the overall score.

17. The non-transitory computer-readable medium of claim 16 wherein the operations further comprise identifying the unreferenced object by querying a general objects database.

18. The non-transitory computer-readable medium of claim 15 wherein the operations further comprise scoring a physical construct of the arrangement of physical objects and wherein the overall score is further based on the scoring of the physical construct.

19. The non-transitory computer-readable medium of claim 15 wherein the operations further comprise transmitting a prompt for an image capture device installed in proximity to the arrangement of physical objects to obtain the captured image.

20. The non-transitory computer-readable medium of claim 15 wherein the operations further comprise transmitting a prompt to a mobile device to display a request to obtain the captured image.

\* \* \* \* \*